United States Patent Office
3,015,689
Patented Jan. 2, 1962

3,015,689
COLOR-TELEVISION CAMERA

Charles J. Hirsch, Locust Valley, N.Y., assignor to Hazeltine Research, Inc., a corporation of Illinois
Filed Aug. 13, 1959, Ser. No. 833,499
8 Claims. (Cl. 178—5.4)

The present invention relates to a color-television camera for developing three separate color signals from a single camera tube.

It has heretofore been conventional practice to develop three separate color signals in a color-television camera by using three camera tubes, each made responsive to a different color in the image, such as red, green and blue. This type of camera is inherently large and cumbersome and is necessarily expensive due to the use of three camera tubes and an additional optical system for separating the image into three separate paths.

Accordingly, it is an object of the present invention to provide a new and improved color-television camera which avoids the disadvantages of prior known cameras.

It is another object of the present invention to provide a color-television camera for deriving at least three separate color signals from the output of a single camera tube.

It is a further object of the present invention to provide a color-television camera for deriving from a single camera tube three separate color signals and a fourth signal at a reference frequency to be used in separating the three color signals.

In accordance with a particular form of the present invention a color-television camera comprises means for deriving an image of a scene to be televised and light filter means for resolving each elemental area of the image in one color and at least two portions of the elemental area into two different additional colors. The camera also includes means for scanning the light output of all such elemental areas to derive a composite signal comprising one low-frequency component representative of the one color and a high-frequency wave carrying, at different phases, modulation components representative of one of the two additional colors. The camera further includes means for detecting the modulation components and means for extracting the low-frequency component from the composite signal.

For a better understanding of the present invention, together with other and further objects thereof, reference is had to the following description taken in connection with the accompanying drawings, and its scope will be pointed out in the appended claims.

Referring to the drawings.

Figure 1:
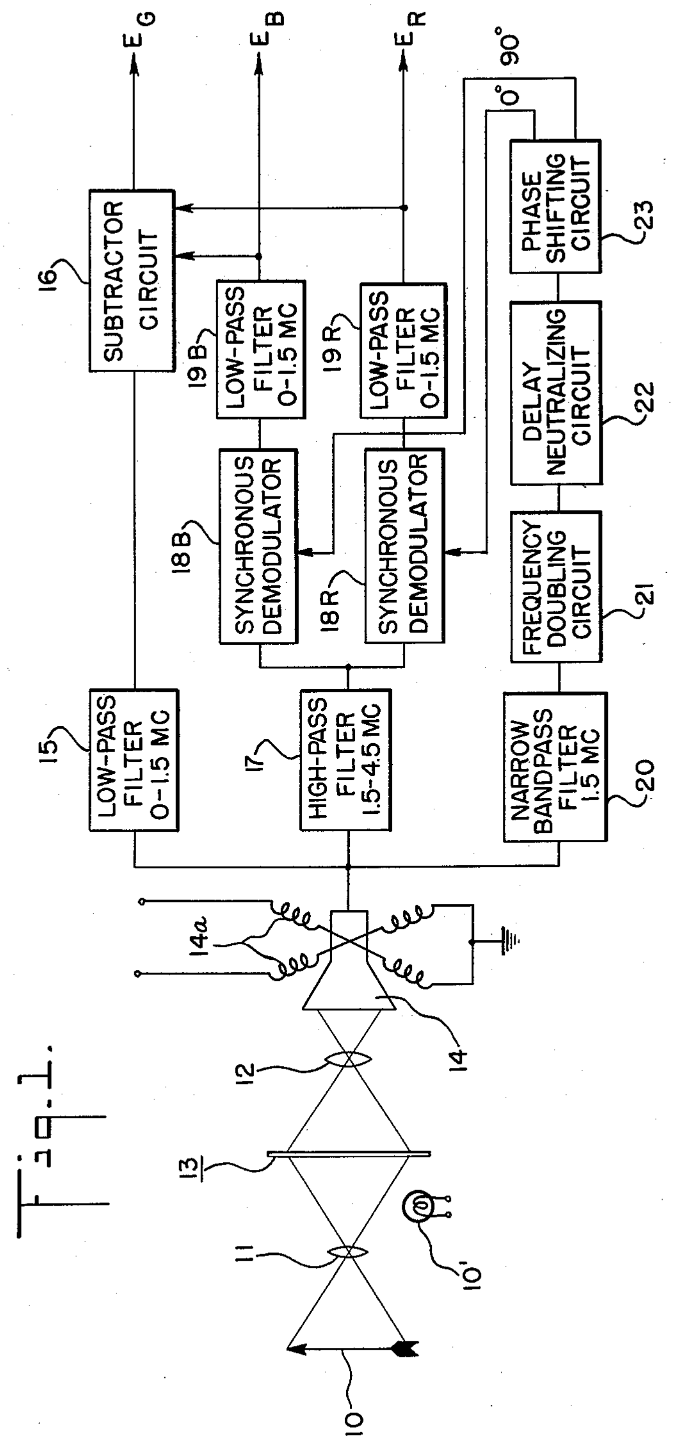
FIG. 1 is a diagram, partly schematic, of a color-television camera constructed in accordance with the present invention.

FIGS. 3*a* through 3*f* are diagrams useful in explaining the operation of the camera of FIG. 1.

Figure 4:
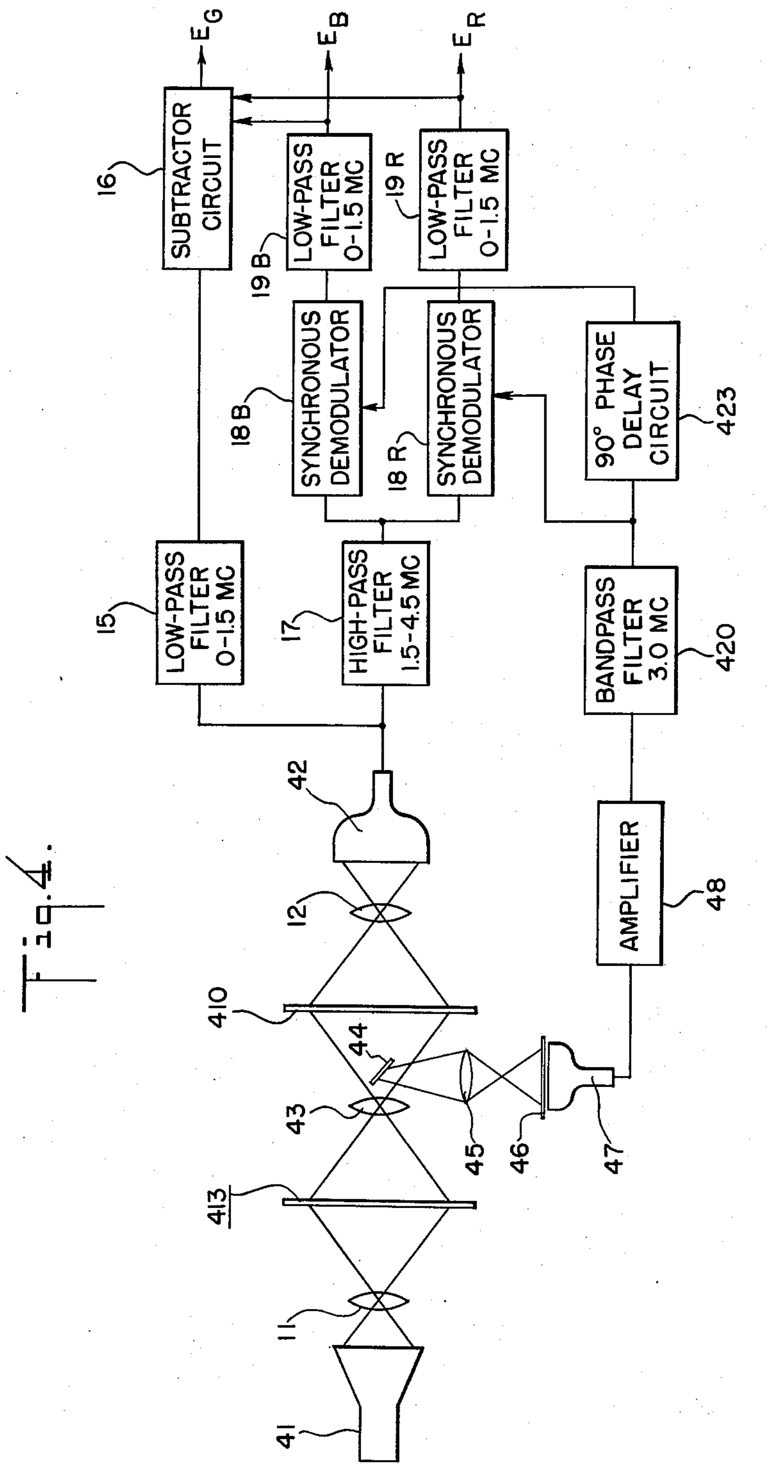

FIG. 4 is a diagram, partly schematic, of an alternate arrangement of the present invention.

*Description of FIG. 1 color-television camera*

Referring to FIG. 1, the color-television camera shown therein comprises means for deriving an image of a scene to be televised. For the purpose of illustration the scene, which is represented by arrow 10, may be a blank, white field uniformly comprised of equal amounts of the colors red, green and blue. The lens 11 focuses an image of arrow 10 on light filter means 13 which is described in greater detail hereinafter. Lens 12 is positioned so as to refocus this image of arrow 10 on the optically active surface of camera tube 14.

Figure 2:
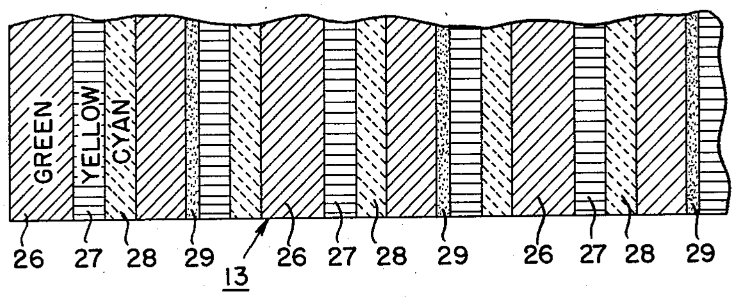
FIG. 2 is an enlarged diagram of a portion of a color filter useful in the present invention.

The color-television camera also comprises light filter means for resolving each elemental area of the image 10 in one color and at least two portions of the elemental area in two different additional colors. In particular, and referring to FIG. 2, filter 13 may include repetitive sets of three different colored filter elements such as green, yellow and cyan strips 26, 27, and 28, respectively. Two of the elements, for example yellow strip 27 and cyan strip 28, recur in fixed spaced relation to the third element, in this case green strip 26. The yellow and cyan strips have a combined width predetermined relative to the width of the third element. The yellow filter strip 27 and the cyan filter strip 28 may each be equal to one-half the width of green filter strip 26. Additionally, in accordance with one form of the invention the filter 13 may include opaque strips 29, 29 for eliminating the color from relatively small portions of alternate one of the elemental areas. In the filter of FIG. 2, strips 29, 29 are shown as being paproximately one-fifth the width of the green strips 26 and positioned within alternate ones of the strips 26 so as to shorten the width thereof. In this manner, the total width of each set of strips 26, 27, and 28 is maintained constant across the face of filter 13.

Camera tube 14 also includes means including conventional deflection coils 14*a* for scanning the light output of all such elemental areas to derive a composite signal comprising one low-frequency component representative of the one color, for example, green, and a high-frequency wave carrying the different phase modulation components, each representative of one of the two additional colors, for example, red and blue. This high-frequency wave is effectively a carrier wave at a frequency determined by the number of repetitive sets of filter strips and the rate at which the elemental areas of the image are scanned by camera tube 14, and is amplitude-modulated at different specific phases as determined by the fixed spatial relation of strips 27 and 28 with respect to strip 26. In addition, for the camera of FIG. 1 using the FIG. 2 filter, the composite signal has a reference-frequency component related in frequency to the high-frequency carrier wave which, in the particular arrangement shown, would be one-half the frequency of the carrier wave. Camera tube 14 may be any conventional camera tube such as would be used in a normal black-and-white television camera, for example, a vidicon.

A small lamp 10′ is located on the side of filter 13 remote from camera tube 14 with its terminals connected to a source of suitable power. Lamp 10′ is adapted to illuminate the entire scanned portion of filter 13 thereby providing a small amount of residual illumination for a purpose which will be explained subsequently. Although it is not important which color of light is emanated from lamp 10′, it may be preferable to choose green.

There is also provided in the color-television camera means for separating and detecting these modulation components from the composite signal. Such means may include high-pass filter 17 coupled to the output terminal of camera tube 14 and having an amplitude pass-band characteristic extending from approximately one-half the frequency of the carrier wave to approximately one and one-half times this frequency, for example, from 1.5 to 4.5 megacycles. The output of filter 17, in turn, is coupled to inputs of synchronous demodulators 18B and 18R, respectively. Coupled to second inputs of demodulators 18B and 18R are reference-frequency signals from phase shifting circuit 23. The output of demodulators 18B and 18R, at which the signal components representative of the colors blue and red appear separately and in low-frequency form, are coupled to low-pass filters 19B and 19R, respectively, wherein frequency components above fixed values, for example, 1.5 megacycles, are rejected. Also included in the means for detecting the modulation components are means for separating from the composite signal the reference-frequency component developed by opaque strips 29, 29. Such means may include band-pass filter 20 connected to the output of camera tube 14 and having a narrow pass bandwidth centered about a frequency of 1.5 megacycles. The output of filter 20 is connected to the input of frequency doubling circuit 21 wherein the 1.5 megacycle frequency signal translated through filter 20 is multiplied to the reference frequency, 3 magacycles. The output of frequency doubling circuit 21 is then connected to the input of delay neutralizing circuit 22 for setting the initial phase of the reference frequency signal at some predetermined value relative to the color signal components of the aforementioned carrier signal at the output of filter 17. Circuit 22 may be a conventional delay line adapted to delay the reference frequency signal by an amount sufficient to place the latter signal in phase synchronism with, for example, the red signal component of the carrier signal. The output of circuit 22 is then connected to the input of phase shifting circuit 23, the outputs thereof being connected to the inputs of demodulators 18B and 18R as previously mentioned. Phase shifting circuit 23 is conventionally constructed to supply the reference frequency signals to the demodulators in phase synchronism with the respective color signal components. For example, where the reference frequency signal is supplied to circuit 23 in synchronism with the red signal component, circuit 23 may be another delay line 90 phase degrees in length with the input terminal thereof directly connected to demodulator 18R and the output terminal thereof connected to demodulator 18B. Other constructions may be utilized, the specific phase relation developed being dependent on the particular construction of filter 13.

Means for extracting the low-frequency component from the composite signal includes low-pass filter 15 coupled to the output of camera tube 14 and having an amplitude band-pass characteristic extending from D.-C. to approximately one-half the aforementioned carrier frequency, for example, 1.5 megacycles. It will be understood that the upper frequency limit of filter 15 and the lower frequency limit of filter 17 need not be exactly 1.5 megacycles. In fact, in the FIG. 1 camera, where the reference frequency signal is derived from the composite signal, the respective upper and lower limits will be determined by the bandwidth of band-pass filter 20 so that there will be no undesirable cross-coupling of the various frequency composite signals into the wrong signal-translating channel.

Means for subtracting portions of the modulation components from the low-frequency components, thereby making the low-frequency component completely representative of the one color, green, includes subtractor circuit 16 coupled to the outputs of low-pass filter 15 and low-pass filters 19B and 19R. The amount of red and blue signal components to be subtracted from the output of filter 15 will be explained in greater detail hereinafter.

*Explanation of operation of FIG. 1 color-television camera*

Figure 3A:
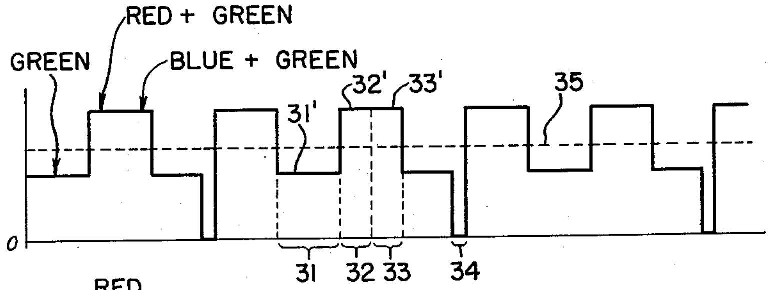

In considering the operation of the color-television camera of FIG. 1, reference will be made to the curves of FIGS. 3*a*–3*f*, inclusive, to aid in the explanation of the operation. In FIG. 1 an image of scene 10 is focused on filter 13 by lens 11. As previously mention, it has been assumed for purposes of illustration that scene 10 is a pure white, blank field uniformly comprising equal amounts of the colors red, green and blue. Filter 13 resolves the image into elemental areas comprising green, yellow, and cyan. The colors yellow and cyan are made up of the colors green and red, and green and blue, respectively. Therefore, green is passed equally by green strip 26, yellow strip 27 and cyan strip 28, while red is passed only through yellow strip 27 and blue through cyan strip 28 as seen in FIG. 3*a*. Alternate elemental areas include small portions thereof in which the color is completely eliminated or blocked out by opaque strips 29, 29.

The image as it has been resolved by filter 13 is then focused on the optically active portion of camera tube 14 wherein the image is converted into a composite electrical signal. An idealized form of the signal reproduced from the assumed white field is illustrated in FIG. 3*a*. During the time increment 31 the beam in tube 14 is scanning that portion of the image passed by green filter strip 26 and also the amplitude 31′ of the composite signal is representative of the one color green. During the next increment of time 32, when the beam is scanning the yellow portion of the image, the amplitude 32′ is representative of the combination of the green and red colors. Correspondingly, the amplitude 33′ during the time increment 33 is determined by the combined colors green and blue. Ignoring for the moment the effect of opaque strips 29, 29, the composite signal derived from the assumed white image has a constant amplitude or level determined by the green color. On top of the level there is added a square wave determined by the presence of red and blue colors, the first half of the square wave being representative of red and the second half of blue. It will be noted that in the recurring sets of time increments 31, 32, and 33, the red and blue portions of the square wave recur at a fixed time relative to the beginning of each cycle and, therefore, occur at a fixed phase relative to the green strip 26.

If it is assumed that across the entire width, $X_0$, of the scanned portion of the filter 13 there are a fixed number, N, of sets of filter strips and the time the beam in camera tube 14 takes to scan at a linear rate orthogonally across one line of strips is $T_L$, then the fundamental repetition or carrier frequency of this superimposed square wave is:

$$f_s=\frac{N}{T_L} \qquad (1)$$

Although, the curve of FIG. 3*a* is illustrated in idealized square wave form, it may be shown that the fundamental components of this signal are (taking into account now the effect of opaque strips 29, 29):

$$E_T=\left[kE_G+\frac{1}{4}(E_R+E_B)\right]+E'_{ref}\sin\left(\frac{\omega_s t}{2}+\phi\right) \qquad (2)$$
$$+E'_R\sin\omega_s t+E'_B\cos\omega_s t$$

where $E_T$=instantaneous values of the fundamental components of the composite signal.

$k$=some constant of proportionality dependent on the width of opaque filter strips 29, 29.

$E_G$, $E_R$, and $E_B$=color signals representative of green, red, and blue, respectively.

$E'_{ref}$, $E'_R$, and $E'_B$=maximum amplitude of the respective first harmonic frequency components as determined by Fourier analysis of the wave.

Figure 3B:
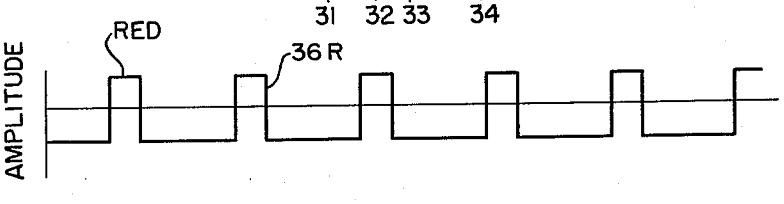
Figure 3C:
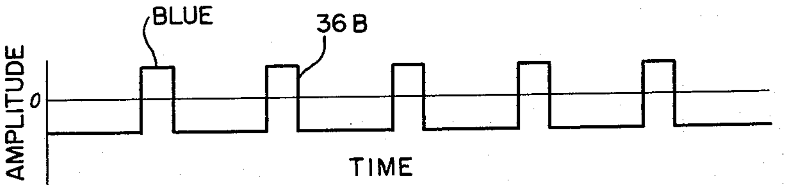
Figures 3D, 3E:
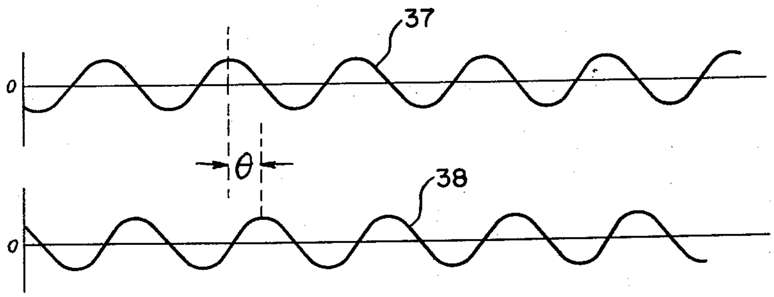
Figure 3F:
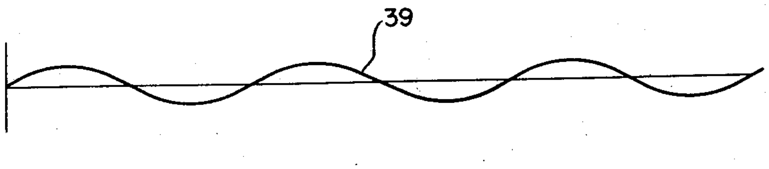

In Equation 2 the term enclosed in the square brackets represents the D.-C. component of the composite signal and is illustrated in FIG. 3*a* by dotted line 35. The second term of Equation 2 represents the reference-frequency component introduced by the opaque filter strips 29, 29 and some phase angle $\phi$ dependent on the position of opaque filter strips 29, 29 within the set of strips 26, 27, and 28. The red and blue square wave components taken from the composite curve of FIG. 3*a* are shown in FIGS. 3*b* and 3*c* as curves 36R and 36B, respectively. The fundamental frequency terms of these square waves are defined by the last two terms of Equation 2. These terms are illustrtaed as waves 37 and 38 of FIGS. 3*d* and 3*e*, respectively, and are seen to be 90° phase displaced relative to each other. This phase displacement of the waves 37 and 38 enables them to be conveniently detected by synchronous demodulators 18B and 18R.

Referring again to FIG. 1, the low-frequency component 35 of FIG. 3*a* is extracted from the composite signal by low-pass filter 15 and supplied to the input of subtractor circuit 16. The carrier wave signal and its modulation side band components are translated by high-pass filter 17 to the inputs of synchronous demodulators 18B and 18R where the modulation components are detected at their respective phases and then translated through low-pass filters 19B and 19R as color signal components $E_B$ and $E_R$, respectively.

In order for synchronous demodulators 18B and 18R to properly detect the modulation components, reference signals are supplied thereto at the appropriate phases by phase shifting circuit 23. This may best be accomplished by deriving the reference-frequency signal from the same source, i.e. filter 13, that produces the carrier-frequency signal. For this purpose, opaque strips 29, 29 have been inserted at filter 13 to produce the wave signal component 39 in FIG. 3*f* as represented by the second term of Equation 2, namely $$E'_{ref}\sin\left(\frac{\omega_s t}{2}+\phi\right)$$

The frequency of this component has been chosen to be half that of the carrier frequency of the modulation components for convenience in extracting this component from the composite signal. Thus band-pass filter 20 separates signal component 39 from the composite signal and frequency doubling circuit 21 increases the frequency to the same value as the carrier frequency. Delay neutralizing circuit 22 operates to compensate for the phase of this reference frequency (represented by $\phi$ in Equation 2). Then, since the red and blue modulation components are phase displaced by 90°, the reference-frequency signal is split into two components phase displaced by 90° by phase shifting circuit 23 and supplied to synchronous demodulators 18B and 18R wherein the modulation components are detected as previously explained.

Considering the term of Equation 2 included within the square brackets, it is seen that the D.C. components of the red and blue signals are translated through low-pass filter 15 and must therefore be subtracted from this signal in order to render the translated signal completely representative of the color green. For this purpose subtractor circuit 16 is supplied with portions of the output of low-pass filters 19B and 19R to subtract these portions from the output of filter 15. For the specific filter arrangement of filters shown in FIG. 2 the suitable portions would be one-quarter of the maximum amplitude of the output of synchronous demodulators 18B and 18R, respectively, as indicated by the term ¼ $(E_R+E_B)$ in Equation 2. To compensate for the term $k$ introduced by opaque strips 29, 29 the output circuit of subtractor circuit 16 may include an amplifier having a signal gain equal to $$\frac{1}{k}$$

In the event that substantial portions of image 10 are black, lamp 10' is inserted to provide a small amount of residual illumination so that the synchronizing information may not be lost. That is, enough residual illumination is used to provide an output from camera tube 14 of sufficient amplitude to render units 20–23, inclusive, operative to derive a reference signal therefrom when, in the extreme case, the entire image 10 is black. Another advantage to be gained from the presence of lamp 10' is that if a green lamp is used then the amount of green light introduced may be proportioned to make up for the attenuation effect of opaque strips 29, 29 on the signal representative of green.

In considering the operation of the FIG. 1 camera it has been assumed that the beam scanning rate of camera tube 14 is constant. However, for the more general case the fundamental output components of camera tube 14 may be derived as follows: The number $n_r$ of yellow strips 27, 27 and $n_b$ of cyan strips 28, 28 passed after the time $t$ (from the start of scanning) are respectively $$n_r=\frac{N}{X_0}\int_0^t v\,dt \qquad (3)$$

and $$n_b=\frac{N}{X_0}\int_0^t v\,dt+\frac{1}{4} \qquad (4)$$

The respective angular distances traversed are $$2\pi n_r=2\pi\frac{N}{X_0}\int_0^t v\,dt \qquad (5)$$

and $$2\pi n_b=\left[2\pi\frac{N}{X_0}\int_0^t v\,dt+\frac{\pi}{2}\right] \qquad (6)$$

the instantaneous frequency is $$2\pi\frac{N}{X_0}v$$

$$E_T'=\left[kE_G+\frac{1}{4}(E_R+E_B)\right]+E'_{ref}\sin\left[\frac{\pi N}{X_0}\int_0^t v\,dt+0\right] \qquad (7)$$

$$+E_R'\sin\left[2\pi\frac{N}{X_0}\int_0^t v\,dt\right]+E_B'\cos\left[2\pi\frac{N}{X_0}\int_0^t v\,dt\right] \qquad (8)$$

In this case it would be preferable to use a phase shifting circuit 23 adapted to develop relatively constant amplitude outputs at the respective 0° and 90° phases.

*Description and operation of FIG. 4 camera*

Referring now to FIG. 4 there is shown therein a color-television camera which operates on basically the same principle as the aforedescribed FIG. 1 camera, except that the arrangement for deriving the reference frequency signal is modified. This modification is a result of the fact that the FIG. 4 camera is adapted to derive the televised image from a transparency by means of a flying spot scanner focused through the transparency onto the photocell pick-up tube. Certain of the elements of the FIG. 4 camera are the same as described with respect to the FIG. 1 camera and, therefore, carry the same reference numerals. Other elements which are similar to corresponding elements of the FIG. 1 camera with slight modifications for use in the FIG. 4 camera carry the same reference numerals preceded by the numeral 4.

The color-television camera of FIG. 4 comprises means for deriving an image of a scene to be televised and includes a conventional flying spot scanner having the output thereof focused by lens 11 through light filter means 413, lens 43, transparency 410, and means 12 onto the face of photocell pick-up tube 42. Filter 413 is of a construction similar to that of filter 13 shown in FIG. 2 with the exception that opaque strips 29, 29 are omitted and green strips 26, 26 are all of equal width. Thus, the spot as it passes through filter 413 is resolved into the elemental areas of one color, green, and at least two different additional colors, yellow and cyan. These elemental areas of light operate to translate the respective colors of transparency 410 to the optically active surface of photocell 42. If it is again assumed that the scene on transparency 410 is a pure white, blank field uniformly comprising equal amounts of the colors red, green, and blue, the idealized output of photocell 42 will be the signal as the composite curve shown in FIG. 3*a* except without the zero amplitude areas caused by opaque strips 29, 29. The circuits connected to the output of photocell 42 operate to derive the three separate color signals in the same manner as with respect to FIG. 1, since, as mentioned, the only substantial difference between the FIG. 1 and FIG. 4 cameras is the particular manner in which the reference frequency signal is derived.

To derive this signal, mirror 44 is placed at an appropriate angle between lens 43 and transparency 410 to reflect the colored light from filter 413 through lens 45 onto the optically active surface of photocell pick-up tube 47. A red filter 46 is placed in front of photocell 47 thereby to render the photocell operative to produce an output signal only from the red color directed thereto. Mirror 44 is relatively small and preferably placed intermediate lens 43 and the second focal point of lens 43 so as not to interfere substantially with the scanning of transparency 410 by scanner 41. The output of photocell 47 therefore is a wave signal at a frequency determined by the number of red filter strips and by the time it takes for the flying spot from scanner 41 to traverse filter 413 as determined by the relationship defined in Equation 1. The output from filter 47 is coupled through amplifier 48 to the input of band-pass filter 420 having a narrow pass bandwidth centered about the reference frequency of 3 megacycles. The reference frequency signal output of filter 420 having been derived from the red filter strips of filter 413 is in phase synchronism with the red component of the carrier signal and may, therefore, be applied directly to synchronous demodulator 18R to derive therein the red color signal as described with relation to the FIG. 1 camera. In addition, the reference frequency signal output of filter 420 is connected to the 90° phase delay circuit 423 which may be the delay circuit described with relation to phase shifter 23 of FIG. 1 wherein the signal is delayed to place it in phase synchronism with the blue signal component and then coupled to the input of synchronous demodulator 18B. As mentioned, the remainder of the camera of FIG. 4 operates in the same manner as with respect to FIG. 1 and need not be further described herein.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A color-television camera comprising: means for deriving an image of a scene to be televised; light filter means for resolving each elemental area of said image in one color and at least two portions of the elemental area in two different additional colors; means for analyzing the light output of all such elemental areas to derive a composite signal comprising one low-frequency component representative of the one color and a high-frequency wave carrying, at different phases, modulation components representative of the two additional colors; means for detecting said modulation components; and means for extracting the low-frequency component from said composite signal.

2. A color-television camera comprising: means for deriving an image of a scene to be televised; light filter means including repetitive sets of different colored filter elements, two of said elements recurring in fixed spaced relation to the third element for resolving each elemental area of said image in one color and at least two portions of the elemental area in two different additional colors; means for analyzing the light output of all such elemental areas to derive a composite signal comprising one low-frequency component representative of the one color and a high-frequency wave carrying at different phases, as determined by said fixed spaced relation, modulation components representative of the two additional colors; means for synchronously detecting said modulation components; and means for extracting the low-frequency component from said composite signal.

3. A color-television camera comprising: means for deriving an image of a scene to be televised; light filter means including repetitive sets of different colored filter elements two of said elements having equal widths fixed relative to the width of the third element for resolving each elemental area of said image in one color and at least two portions of the elemental area in two different additional colors; means for analyzing the light output of all such elemental areas to drive a composite signal comprising one low-frequency component representative of the one color and a high-frequency wave carrying, at different phases, modulation components representative of the two additional colors; means for synchronously detecting said modulation components; and means for extracting the low-frequency component from said composite signal.

4. A color-television camera comprising: means for deriving an image of a scene to be televised; light filter means including repetitive sets of green, yellow, and cyan filter strips, the yellow and cyan strips each having a width one-half that of the green strip and recurring in fixed spaced relation to the green strip for resolving each elemental area of said image in green and two portions of the elemental area in additional red and blue colors; means for analyzing the light output of all such elemental areas to derive a composite signal comprising one low-frequency component representative of green and a high-frequency wave carrying, at different phases, modulation components representative of the additional red and blue colors; means for synchronously detecting said modulation components; and means for extracting the low-frequency component from said composite signal.

5. A color-television camera comprising: means for deriving an image of a scene to be televised; light filter means for resolving each elemental area of said image in one color and at least two portions of the elemental area in two different additional colors; means for analyzing the light output of all such elemental areas to derive a composite signal comprising one low-frequency component representative of the one color and a high-frequency wave carrying, at different phases, modulation components representative of the two additional colors; means responsive to one of the two additional colors and to the composite signal for detecting said modulation components; and means for extracting the low-frequency component from said composite signal.

6. A color-television camera comprising: means for deriving an image of a scene to be televised; light filter means for resolving each elemental area of said image in one color and at least two portions of the elemental area in two different additional colors and for eliminating the color from portions of said elemental areas; means for analyzing the light output of all such elemental areas to derive a composite signal comprising one low-frequency component representative of the one color, a wave at a predetermined high frequency carrying, at different phases, modulation components representative of the two additional colors, and a reference component related in frequency to said predetermined high frequency; means for synchronously detecting said modulation components; and means for extracting the low-frequency component from said composite signal.

7. A color-television camera comprising: means for deriving an image of a scene to be televised; light filter means for resolving each elemental area of said image in one color and at least two portions of the elemental area in two different additional colors and for eliminating the color from relatively small portions of alternate ones of said elemental areas; means for analyzing the light output of all such elemental areas to derive a composite signal comprising one low-frequency component representative of the one color, a wave at a predetermined high frequency carrying, at different phases, modulation components representative of the two additional colors, and a reference component at one-half said predetermined frequency; means for synchronously detecting said modulation components; and means for extracting the low-frequency component from said composite signal.

8. A color-television camera comprising: means for deriving an image of a scene to be televised; light filter means for resolving each elemental area of said image in one color and at least two portions of the elemental area in two different additional colors; means for analyzing the light output of all such elemental areas to derive a composite signal comprising one low-frequency component a major portion of which is representative of the one color and a high-frequency wave carrying, at different phases, modulation components representative of the two additional colors; means for synchronously detecting said modulation components; means for extracting the low-frequency component from said composite signal; and means for subtracting portions of the modulation components from the low-frequency component thereby to make the low-frequency component completely representative of said one color.

References Cited in the file of this patent

UNITED STATES PATENTS

| | | |
|---|---|---|
| 2,892,883 | Jesty et al. | June 30, 1959 |
| 2,907,817 | Teer | Oct. 6, 1959 |
| 2,922,837 | Boothroyd et al. | Jan. 26, 1960 |